United States Patent Office 3,646,235
Patented Feb. 29, 1972

3,646,235
CATALYTIC HYDROGENATION OF ALPHA METHYL STYRENE
Edwin D. Little, Convent Station, and Zafarullah K. Cheema, Morristown, N.J., assignors to Allied Chemical Corporation, New York, N.Y.
No Drawing. Filed Sept. 22, 1969, Ser. No. 860,070
Int. Cl. C07c 5/16
U.S. Cl. 260—667          4 Claims

ABSTRACT OF THE DISCLOSURE

Alpha ethyl styrene, obtained as a by-product in the manufacture of phenol is hydrogenated back to cumene using hydrogen and standard hydrogenation catalysts which are selective for the ethylenic side chain. Prior to hydrogenation the alpha methyl styrene is treated to effect removal of hydroxy acetone present. By reducing or eliminating hydroxy acetone, poisoning of the catalyst is prevented. Hydroxy acetone is removed from the alpha methyl styrene by water washing, distillation, or by chemical methods as for example by treating with an amine.

BACKGROUND OF THE INVENTION

One of the most widely used processes for the preparation of phenol comprises oxidizing cumene to form a reaction mixture containing cumene hydroperoxide as one of its prime components and then decomposing the cumene hydroperoxide to form phenol. Depending on the reaction conditions in the decomposition step, there is also formed varying amounts of by-products such as acetone, dimethyl phenyl carbinol, acetophenone, and alpha methyl styrene and in the overall process a great number of impurities, most of which have not been identified. Certain of these by-products represent valuable products, for example, acetone is a valuable solvent and para-alpha-cumylphenol can be employed in the preparation of polymeric compositions. Alpha methyl styrene, on the other hand, has only limited use and is often burned as fuel.

In order to more efficiently utilize alpha metal styrene, the prior art teaches that it may be hydrogenated to form cumene which in turn can be recycled in the cumene-phenol process, however, such has not heretofore been especially successful on a commercial scale.

The difficulties encountered in hydrogenating alpha-methyl styrene obtained from this source is due to inhibiting factors, or catalyst poisons, which decrease catalyst efficiency to the point where frequent renewal or regeneration of the hydrogenation catalyst system is necessary. One known class of compounds which decreases catalyst efficiency is sulfur containing compounds, such as mercaptans, which are thought to be present or formed during the manufacture of phenol.

The prior art has attempted to solve this problem by employing selective conditions and catalysts and also by employing agents or additives which act as catalyst promoters. For the most part, however, it is still necessary to frequently regenerate the catalyst system, and thus many commercial manufacurers still find it more economical to burn the alpha methyl styrene as fuel rather than convert it to cumene.

The present invention obviates these problems by providing an improved method for hydrogenating alpha methyl styrene wherein the effectiveness of the catalyst system is greatly prolonged.

SUMMARY OF THE INVENTION

An improved process for hydrogenating alpha methyl styrene obtained by the decomposition of cumene hydroperoxide using standard hydrogenation catalysts and conditions, the improvement residing in effecting the hydrogenation in the absence of hydroxyacetone, an impurity which is formed with alpha methyl styrene and has been found to be a catalyst poison.

DESCRIPTION OF THE PREFERRED EMBODIMENT

We have found that one of the major factors contributing to the poisoning of catalyst systems when alpha methyl styrene is hydrogenated, is the presence of a carbonyl compound formed along with alpha methyl styrene during the manufacture of phenol from cumene. This carbonyl compound is known as 1-hydroxy-2-propanone, hydroxyacetone, or acetol. More specifically, we have found that when hydroxyacetone is present along with alpha methyl styrene, the effectiveness of a hydrogenation catalyst is greatly reduced. Accordingly, the present invention relates to an improved process for hydrogenating alpha methyl styrene, obtained by the decomposition of cumene hydroperoxide, using hydrogen and a hydrogenation catalyst wherein the alpha methyl styrene is essentially free of hydroxy acetone.

As has been previously stated, when cumene hydroperoxide is decomposed with an acid catalyst, the mixture thus obtained contains among the identifiable products, phenol, dimethylphenyl carbinol, acetophenone, alpha methyl styrene, para-alpha-cumylphenol and water. These by-products are separated and removed in separate streams by fractional distillation. Analysis of the crude alpha methyl styrene so obtained (Table 1) indicates that a number of identifiable products are carried over with alpha methyl styrene and further investigation has revealed that although these impurities do somewhat inhibit the hydrogenation, that hydroxyacetone severely poisons a hydrogenation catalyst.

TABLE 1

Contents of typical sample of crude AMS [1] obtained as a by-product in the manufacture of phenol

|  | Percent |
| --- | --- |
| AMS [1] | 74.0 |
| Acetone | 0.2 |
| Hydroxyacetone | 1.3 |
| Acetophenone | 0.2 |
| 2,2-dimethylphenyl carbinol | 1.8 |
| Phenol | 21.1 |
| AMS dimers | 1.1 |
| Water | 0.6 |
| Unknowns | 0.3 |

[1] Alpha methyl styrene.

Hydrogenation of other streams containing alpha methyl styrene and acetol has confirmed that catalyst life and/or rate of hydrogenation is directly related to the amount of hydroxyacetone present. Where concentrations are small (i.e. less than 0.1 wt. percent), as for example in acetone column bottoms, catalyst life is longer than in alpha methyl styrene obtained from the overhead of the acetone columns where hydroxyacetone concentrate is as high as 1%.

The method by which removal of hydroxyacetone from alpha methyl styrene is accomplished is not critical to the present invention and can be effected in several ways such as by water washing, extractive azeotropic distillation, or by chemical means as by treatment with an amine.

In removing hydroxyacetone by water washing, the crude alpha methyl styrene is contacted with sufficient water to form a two-phase solution. The hydroxyacetone which is soluble in water can thus be removed by simple decantation or centrifugation. Similarly, removal can be accomplished by treating a sample of alpha methyl styrene containing hydroxyacetone with a polyamine. The polyamine is thought to interact with or bind the carbonyl-bearing impurities in such a manner that alpha methyl styrene free of the carbonyl-bearing impurities can be recovered by distillation. Suitable polyamine compounds that may be used include ortho, meta and para-isomers and mixtures thereof of xylyenediamine, tolylene diamine, hexamethylene diamine, and phenylenediamine. Additional polyamines include 4,5-diaminoxylene, 3,5-diaminobenzoic acid, diethylene triamine, and triethylene tetramine.

In hydrogenating alpha methyl styrene according to the present invention the particular steps are also not critical. As has been previously stated, the prior art adequately teaches many methods for hydrogenating alpha methyl styrene under varying reaction conditions and employing numerous catalyst systems and all of these are employable in the present invention. For example, the prior art indicates that alpha methyl styrene can be catalytically hydrogenated in the liquid or vapor phase at temperatures ranging from 24–400° C. and at pressures ranging from 0 to 5000 p.s.i.g. Similarly, a variety of catalysts and catalyst supporting systems have been satisfactorily employed. Exemplary of a few of these catalysts include nickel, such as nickel preparations, and other nickel catalysts produced by the decomposition of nickel alloy or by the reduction of a nickel salt; platinum metals, especially palladium; cobalt, and chromium oxide and catalysts comprising mixtures of nickel, chromium and copper as described in German Pat. 1,134,361. The aforementioned catalysts have been employed in amounts ranging from 0.5 to 10% by weight, suspended in a liquid or supported on external surfaces (pellet or powder) of aluminum oxide, silica acid, diatomaceous earth, charcoal, or Filter Gell, and are present in only minor or catalytic amounts when considering the total catalyst charge in relationship to the total reaction mixture.

Although as previously stated the particular catalyst and reaction conditions are not critical to the invention, it must be appreciated that certain catalysts are less expensive and more active and selective for hydrogenating the ethylenic side chain of alpha methyl styrene, rather than the aromatic nucleus than others, and it is expected that the choice of a particular catalyst will be governed accordingly. For our purposes we prefer to use palladium or platinum, but preferably palladium on carbon, with palladium in amounts ranging from 1–5%. Likewise we prefer to effect the hydrogenation of alpha methyl styrene under conditions wherein the temperature is maintained at about 24–120° C. and at a pressure of 10–100 p.s.i.g., and preferably at about 24–50° C. and 10–50 p.s.i.g.

The following example illustrates the effect of the presence of hydroxyacetone on catalyst life and hence, hydrogen uptake when alpha methyl styrene is hydrogenated. In carrying out the process, at ambient temperature (24–50° C.), the test sample was placed in a standard Parr low pressure hydrogenator with a given amount of catalyst.

EXAMPLE 1

A mixture comprising 40 g. of alpha methyl styrene and 10 g. of cumene was placed in a standard Parr low pressure hydrogenator along with 0.75 g. of a catalyst comprising 1% palladium on carbon.

The pressure bottle was flushed with hydrogen several times and then pressurized to 45–50 p.s.i.g. at 24–50° C. and the alpha methyl styrene reduction was followed by the drop in $H_2$ pressure. The vessel was repressurized when the $H_2$ gauge read lower than 30 p.s.i.g. When $H_2$ uptake was complete, the catalyst was removed by centrifugation followed by decantation or simple filtration. The catalyst thus recovered was used with a fresh charge of alpha methyl styrene sample until the catalyst was no longer active as indicated by no $H_2$ uptake or hydrogenations taking at least an hour (usual time 8–15 minutes). The hydrogenation rate of alpha methyl styrene was 120 g./hr. and the catalyst was still active and the hydrogenation rate unaffected after 7 hours of use involving 15 hydrogenations.

When the above procedure was repeated using a sample comprising 40 g. of alpha methyl styrene and 0.4 g. of hydroxyacetone and 0.15 g. of 5% palladium on carbon the hydrogenation rate of alpha methyl styrene dropped to 40 g./hr. and the catalyst was inactive within 70–80 minutes.

We claim:

1. In the process for hydrogenating a crude α-methyl styrene feed stream obtained from a fractional distillation of a cumene hydroperoxide decomposition product, said hydrogenation being conducted in the presence of a palladium catalyst, the improvement which comprises treating said α-methyl styrene to remove hydroxyacetone prior to hydrogenation.

2. The process according to claim 1 wherein said α-methyl styrene is treated with water to form two phases and separated from the aqueous phase.

3. The process according to claim 1 wherein said α-methyl styrene is treated with a polyamine and distilled.

4. The process according to claim 1 wherein the catalyst is palladium on a carbon support containing 1 to 5% by weight of palladium.

References Cited

UNITED STATES PATENTS

| | | | |
|---|---|---|---|
| 3,391,198 | 7/1968 | Joris et al. | 260—621 G |
| 3,436,429 | 4/1969 | Flickinger et al. | 260—621 G |
| 3,127,452 | 3/1964 | Codignola | 260—667 |
| 3,268,608 | 8/1966 | De Rosset | 260—674 |
| 3,379,767 | 4/1968 | Kreiter et al. | 260—674 |
| 3,436,429 | 4/1969 | Flickinger et al. | 260—667 |
| 3,478,121 | 11/1969 | Aglietti et al. | 260—674 |

CURTIS R. DAVIS, Primary Examiner

U.S. Cl. X.R.

260—621 G, 674 A, 683.9